(12) United States Patent
Hintz

(10) Patent No.: US 9,812,949 B2
(45) Date of Patent: Nov. 7, 2017

(54) POLY-PHASE INVERTER WITH INDEPENDENT PHASE CONTROL

(71) Applicant: Andrew Stephen Hintz, Avon, IN (US)

(72) Inventor: Andrew Stephen Hintz, Avon, IN (US)

(73) Assignee: Indy Power Systems LLC, Carmel, IN (US)

( * ) Notice: Subject to any disclaimer, the term of this patent is extended or adjusted under 35 U.S.C. 154(b) by 314 days.

(21) Appl. No.: 14/050,959

(22) Filed: Oct. 10, 2013

(65) Prior Publication Data

US 2015/0103574 A1 Apr. 16, 2015

(51) Int. Cl.
*H02M 1/42* (2007.01)
*H02J 3/28* (2006.01)
*H02J 3/18* (2006.01)
*H02M 7/5387* (2007.01)
*H02M 7/797* (2006.01)
(Continued)

(52) U.S. Cl.
CPC ............. *H02M 1/42* (2013.01); *H02J 3/18* (2013.01); *H02J 3/26* (2013.01); *H02J 3/28* (2013.01); *H02J 3/382* (2013.01); *H02J 7/345* (2013.01); *H02J 7/35* (2013.01); *H02M 7/53875* (2013.01); *H02M 7/797* (2013.01); *H02M 3/04* (2013.01); *H02M 2001/007* (2013.01); *Y02B 70/12* (2013.01); *Y02E 40/30* (2013.01); *Y02E 40/50* (2013.01)

(58) Field of Classification Search
CPC ...................................... H02M 1/42
USPC ............... 363/16, 17, 69, 127, 132, 55
See application file for complete search history.

(56) References Cited

U.S. PATENT DOCUMENTS 3,463,995 A 8/1969 Herold
4,025,860 A 5/1977 Shibata
(Continued)

FOREIGN PATENT DOCUMENTS

JP 09056007 A 2/1997

OTHER PUBLICATIONS

Cleveland, Terry; "Bi-Directional, Portable, Power-Management System for Multi-Cell, Li-Ion Battery Pack Applications"; Microchip Technology, Inc.; Battery Power Products & Technology:Solutions for OEM Design Engineers, Integrators & Specifiers of Power Management Products; vol. 11, Issue 2; www.BatteryPowerOnline.com; Mar./Apr. 2007.

*Primary Examiner* — Jue Zhang
*Assistant Examiner* — Trinh Dang
(74) *Attorney, Agent, or Firm* — Taft Stettinius & Hollister, LLP; Anthony P. Filomena, II

(57) ABSTRACT

A converter system and inverter system are disclosed with individual real and reactive power control for each phase of a poly-phase system. The converter system includes a controller, bidirectional single-phase inverters with AC sides coupled to an AC line filter and DC sides connected in parallel to a link capacitor coupled to DC/DC converters. Each inverter handles a separate AC phase. The controller controls the inverters and DC/DC converters so the current amplitude of each AC phase is independent, and the phase difference of each AC phase is independent. The inverters can be galvanically isolated between the DC and AC sides. The inverters can be non-isolated inverters having line and neutral connectors coupled to an isolated transformer winding, and the output windings of the transformer can be wired in a Wye configuration. The inverters can have local controllers.

20 Claims, 5 Drawing Sheets

(51) Int. Cl.
  *H02J 3/26* (2006.01)
  *H02J 3/38* (2006.01)
  *H02J 7/34* (2006.01)
  *H02J 7/35* (2006.01)
  *H02M 3/04* (2006.01)
  *H02M 1/00* (2006.01)

(56) References Cited

U.S. PATENT DOCUMENTS

| | | | |
|---|---|---|---|
| 4,277,737 A | 7/1981 | Muller | |
| 4,345,197 A | 8/1982 | Wheadon | |
| 4,348,628 A | 9/1982 | Loucks | |
| 4,689,531 A | 8/1987 | Bacon | |
| 4,849,682 A | 7/1989 | Bauer | |
| 5,742,496 A * | 4/1998 | Tsutsumi | H02M 7/4807 363/16 |
| 5,767,658 A | 6/1998 | Hayes | |
| 5,808,448 A | 9/1998 | Naito | |
| 5,896,022 A | 4/1999 | Jacobs | |
| 5,910,722 A | 6/1999 | Lyons | |
| 6,184,659 B1 | 2/2001 | Darmawaskita | |
| 6,229,279 B1 | 5/2001 | Dierker | |
| 6,232,674 B1 | 5/2001 | Frey | |
| 6,320,358 B2 | 11/2001 | Miller | |
| 6,331,365 B1 | 12/2001 | King | |
| 6,507,506 B1 | 1/2003 | Pinas | |
| 6,515,872 B2 | 2/2003 | Nakayama | |
| 6,577,099 B2 | 6/2003 | Kruger | |
| 6,583,602 B2 | 6/2003 | Imai | |
| 6,661,108 B1 | 12/2003 | Yamada | |
| 6,680,600 B2 | 1/2004 | Emori | |
| 6,713,988 B2 | 3/2004 | Dubac | |
| 6,866,107 B2 | 3/2005 | Heinzmann | |
| 6,879,057 B1 | 4/2005 | Pinas | |
| 6,886,647 B1 | 5/2005 | Gotta | |
| 7,084,525 B2 | 8/2006 | Rajashekara | |
| 7,154,237 B2 | 12/2006 | Welchko | |
| 7,193,392 B2 | 3/2007 | King | |
| 7,199,535 B2 | 4/2007 | Welchko | |
| 7,282,814 B2 | 10/2007 | Jacobs | |
| 7,388,352 B2 | 6/2008 | Bayne | |
| 7,518,886 B1 * | 4/2009 | Lai et al. | 363/17 |
| 7,579,792 B2 | 8/2009 | Nagashima | |
| 7,595,597 B2 | 9/2009 | King | |
| 7,800,331 B2 | 9/2010 | Chakrabarti | |
| 8,076,797 B2 | 12/2011 | Kramer | |
| 2003/0209375 A1 | 11/2003 | Suzuki | |
| 2005/0035737 A1 | 2/2005 | Elder | |
| 2005/0035741 A1 | 2/2005 | Elder | |
| 2005/0082095 A1 | 4/2005 | Tamai | |
| 2005/0141154 A1 | 6/2005 | Consadori | |
| 2005/0174092 A1 | 8/2005 | Dougherty | |
| 2005/0285566 A1 | 12/2005 | Furukawa | |
| 2006/0098390 A1 | 5/2006 | Ashtiani | |
| 2006/0125319 A1 | 6/2006 | King | |
| 2006/0201724 A1 | 9/2006 | Leblanc | |
| 2007/0184339 A1 | 8/2007 | Scheucher | |
| 2007/0188114 A1 | 8/2007 | Lys | |
| 2007/0219670 A1 | 9/2007 | Tanaka | |
| 2007/0247116 A1 | 10/2007 | Morita | |
| 2007/0247117 A1 | 10/2007 | Morita | |
| 2007/0272116 A1 | 11/2007 | Bartley | |
| 2007/0284159 A1 | 12/2007 | Takami | |
| 2008/0018299 A1 | 1/2008 | Renda | |
| 2008/0031019 A1 | 2/2008 | Alexander | |
| 2008/0042493 A1 | 2/2008 | Jacobs | |
| 2009/0028532 A1 * | 1/2009 | El-Antably et al. | 388/819 |
| 2009/0033252 A1 | 2/2009 | Smith | |
| 2009/0322264 A1 * | 12/2009 | Imura | 318/400.09 |
| 2011/0133704 A1 * | 6/2011 | Zambetti | H02M 3/1584 323/212 |
| 2012/0007571 A1 * | 1/2012 | Huisman | 323/271 |

* cited by examiner

POLY-PHASE INVERTER WITH INDEPENDENT PHASE CONTROL

BACKGROUND AND SUMMARY

The present invention generally relates to DC/AC converters and inverters, and more specifically to bidirectional DC/AC converters or inverters that can be used for managing micro grids and in the grid storage and renewable energy fields.

A typical inverter is usually wired such that there is no 'neutral' connection, which is generally referred to as a Delta configuration. The other common wiring configuration is known as "Wye", in which all three phases are wired along with a neutral connection. The Delta configuration is usually done to save on the number of power switching devices that are used (a three-phase inverter can operate with six power switching devices, and this configuration is commonly referred to as a Hex-Bridge topology). In addition, typical multi-phase inverters must operate in a "balanced" mode. This means that at any one time the sum of the currents in the system must equal zero. In the case of a typical three-phase inverter, the three phase currents must instantaneously sum to zero. The result of this requirement is that the phase angle of the currents (or power factor) is usually constant among all three phases. It would be possible to make the phases individually controllable, but in this configuration only two of the phases can be controlled, and the third phase would need to be a function of the other two phases such that the sum of the currents is equal to zero.

Another limiting factor of the three-phase hex bridge-based inverter is that the real component of the power must have the same polarity. This means that the inverter is either net sourcing power to the grid, or net sinking power to the grid on all three phases.

It would be desirable to have an inverter that can individually control multiple phases of AC power and that can inject an independent amount of reactive power onto each phase. For example, one phase could be injecting lagging reactive power while other phases are injecting leading reactive power, depending on the situation. It would also be desirable to have an inverter that can independently control reactive power, where each phase can have independent control of the real power component, such that one phase can be sourcing power to the AC connection while the other phases are sinking power from the AC connection.

A converter system is disclosed with individual real and reactive power control for each phase of a poly-phase system. The converter system couples one or more DC loads and/or sources to one or more AC loads and/or sources, each of the AC loads/sources using AC power having a plurality of AC phases, and each AC phase including a current waveform having a current amplitude and a current phase angle and a voltage waveform having a voltage amplitude and a voltage phase angle. The converter system includes a bidirectional poly-phase inverter, an AC line filter, a link capacitor, at least one DC to DC converter and a controller. The bidirectional poly-phase inverter includes a plurality of single-phase inverters, where each of the single-phase inverters has an AC side and a DC side, and handles a separate AC phase of the AC loads/sources. The AC line filter has an AC inverter side coupled to the AC sides of the plurality of single-phase inverters, and an AC source/load side coupled to the AC loads/sources. The link capacitor is connected in parallel with the DC sides of the plurality of single-phase inverters. The DC to DC converter(s) is connected in parallel with the link capacitor, and is coupled to the DC loads/sources. The controller controls the plurality of bidirectional single-phase inverters and the at least one bidirectional DC to DC converters. The controller controls the current amplitude of the current waveform of each AC phase independently of the current amplitude of the current waveform of the other AC phases. The controller also controls the difference between the current and voltage phase angles of each AC phase independently of the difference between the current and voltage phase angles of the other AC phases.

The plurality of single-phase inverters can consist of only three single-phase inverters; and all of the AC loads/sources can use three phase AC power. Each of the single-phase inverters can be a bi-directional single-phase DC/AC inverter galvanically isolated from the DC side to the AC side. Each of the single-phase inverters can be a non-isolated single-phase inverter having a line connector and a neutral connector coupled to an isolated transformer winding, and the output windings of the transformer can be wired in a Wye configuration. Each of the single-phase inverters can include a local controller.

A bi-directional poly-phase DC/AC inverter is disclosed that includes an AC side and a DC side. The AC side receives and/or sources AC power, where the AC power includes a plurality of AC phases, each AC phase including a current waveform having a current amplitude and a current phase angle and a voltage waveform having a voltage amplitude and a voltage phase angle. The DC side receives and/or sources DC power. For each individual AC phase of the plurality of AC phases, the current amplitude of the current waveform is controlled independently of the current amplitude of the current waveform in the other AC phases, and the difference between the current and voltage phase angles is controlled independently the difference between the current and voltage phase angles in the other AC phases. The AC power can have three AC phases. The bi-directional poly-phase DC/AC inverter can include three separate bi-directional single-phase DC/AC inverters, each of the three separate single-phase inverters controlling a different one of the three AC phases.

Each of the single-phase inverters can be galvanically isolated from the DC side to the AC side. Each of the single-phase inverters can be a non-isolated single-phase inverter having a line connector and a neutral connector coupled to an isolated transformer winding; the output windings of the transformer being wired in a Wye configuration. Each of the single-phase inverters can be an H-bridge that includes of a plurality of power switching devices, and the power switching devices can be in parallel with diodes wired in an anti-parallel configuration. The power switching devices can be MOSFET transistors or IGBT transistors.

DESCRIPTION OF EXEMPLARY EMBODIMENTS

Figure 1:
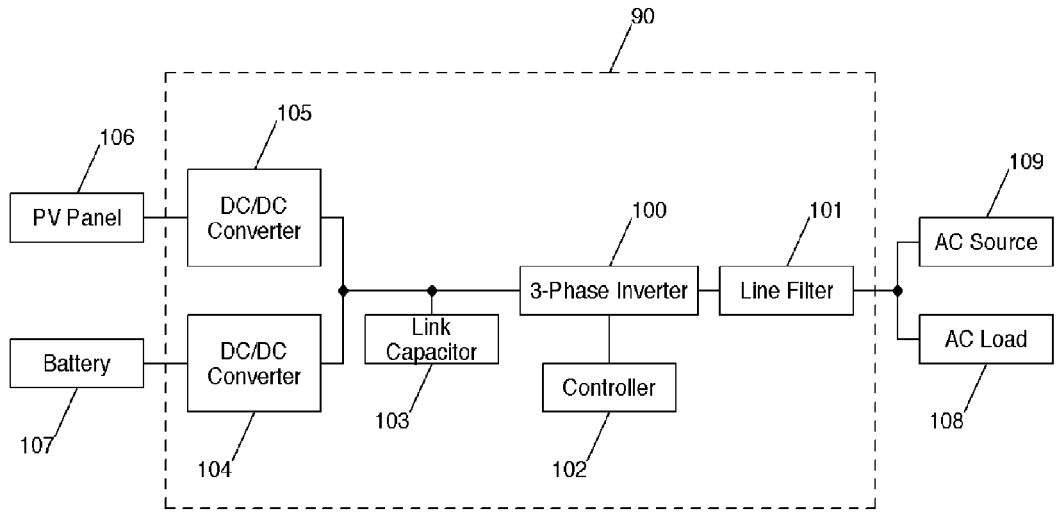
FIG. 1 illustrates an exemplary embodiment of a DC/AC converter system that includes a three-phase inverter having an AC side and a DC side.

The exemplary embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Inverter embodiments can be described generally as polyphase inverters as they can convert DC power into a plurality of AC phases. For most applications, either single-phase or three-phase operation is used, but there are no specific limits on the number of phases that can be supported. The polyphase inverter can independently control each of the multiple phases.

AC Power is typically comprised of one to three phases of power flow and a neutral, or common, connection among all the phases. In three-phase systems, the phases are generally referred to as A, B, and C. Each of these phases is a sinusoidal voltage of a fixed frequency, 60 Hz in the United States and some parts of the world, 50 Hz in most other parts of the world. Each of these three phases is 120 degrees out of phase with the other phases. The resulting AC current that is delivered to loads on the AC Grid is also sinusoidal. Depending on the type of load connected, the phase angle between one phase's voltage and current may change. A purely resistive load will provide a current that is completely in phase with the voltage, and the magnitude of the current will follow Ohm's Law. If a load has impedance associated with it, then the current wave will lag (or trail) the voltage wave. A capacitive element will cause the current wave to lead the voltage wave. It is usually desirable to deliver purely resistive power to a load as this provides the maximum amount of power delivered to do 'real' work. If the load does not appear as purely resistive, then there will be power that 'bounces' back and forth along the power grid lines taking up capacity that otherwise could be doing useful work. The phase angle, theta, between the voltage and current wave forms can be used to compute the power factor, PF, by the relationship of PF=cos(theta). A purely resistive current will have a power factor of 1, and a purely inductive or capacitive current will have a power factor of 0. Power supplied to resistive loads is referred to as Real Power, whereas power supplied to capacitive or inductive loads is referred to as Reactive Power. The resulting power that is a combination of the Real and Reactive power components is referred to as Apparent Power.

An inverter can individually control multiple phases of AC power; for example the inverter can inject an independent amount of reactive power onto each phase. One phase could be injecting lagging reactive power while the other phases are injecting leading reactive power, and this can vary, as the circuit requires. In addition to independent control of reactive power, each phase can have independent control of the real power component, for example one phase can be sourcing power to the AC connection while the other phases are sinking power from the AC connection.

Additional circuitry can be used to allow for ancillary DC inputs to the system. These ancillary DC inputs can be used for various functions. For example, the ancillary DC inputs can be used as interfaces for Photovoltaic (PV) generation, for DC energy storage, or for DC loads. The DC energy storage, for example, could be a battery storage system. With the addition of a rectifier module, any AC input, such as wind generation or a AC generator, could be converted into a DC input for the system.

FIG. 1 illustrates an exemplary embodiment of a DC/AC converter system 90. The converter system 90 includes a three-phase inverter 100 having an AC side and a DC side. The inverter 100 is controlled via signals sent from the controller 102. The AC side of the inverter 100 is coupled to a line filter 101, which is coupled to an AC source 109 and an AC load 108. The AC source 109 can represent a plurality of AC sources, and the AC load 108 can represent a plurality of AC loads. The DC side of the inverter 100 is coupled to DC/DC converters 104 and 105, which are tied in parallel with a link capacitor 103. The link capacitor 103 does not need to be a separate component; instead the capacitance inherent to the devices and wires (parasitic capacitance) in the inverter 100 could be used as this capacitance. In this exemplary embodiment, the DC/DC converter 104 is coupled to a battery, or battery pack, 107 and the DC/DC converter 105 is coupled to a PV panel, or array of panels, 106.

In the converter system 90, the inverter 100 can pull power from the AC source(s) 109, or sink power to the AC load(s) 108. If the AC source 109 and the AC load 108 are three-phase power, then the three-phase inverter 100 would be able to control each phase of the AC source 109 and the AC load 108 individually. In the event that the power being drawn in by the converter system 90 from the AC sources 109 is equal to the power being sent by the converter system 90 to the AC loads 108, then the link capacitor 103 can handle some or all of the short term energy storage. If there is an imbalance of power, then the excess power (whether it is net drawn in from the AC sources 109, or net sent to the AC loads 108) can be handled through the DC/DC converter 104 with power flow to or from the battery 107 as needed.

When the system 90 is receiving energy generated by the PV source 106 through the DC/DC converter 105, then power can be sent through the inverter 100 to the AC loads 108. Any power from the PV source 106 that is not sent out of the inverter 100 to the AC loads 108 can be sent through the DC/DC converter 104 to the battery 107. During this mode of operation, power could be drawn through the inverter 100 from any phase of the AC source 109. In addition to the general flow of electrical power through the inverter 100, the inverter 100 can control the phase angle of the AC current relative to the voltage. This has the effect of injecting reactive power into that particular phase of the AC load 108 which can be used to offset reactive power requirements of the AC load 108. This control by the inverter 100 can be set on each individual AC phase independent of the other AC phases.

This converter system 90 is not limited by the number of DC/DC converters connected on the DC side of the inverter 100. While two DC/DC converters 104, 105 are shown in FIG. 1, any number of DC/DC converters can be placed in parallel on the DC side of the inverter 100.

The inverter 100 can also operate as a voltage-source inverter (VSI) in the event that the AC Source 109 is removed from the converter system 90, thus allowing for uninterruptible operation to the AC Load 108. The inverter can switch to a VSI by changing the control algorithm that is used in the controller 102. When operating as a VSI, the inverter will supply whatever current magnitude and phase is required to maintain the proper voltage output to the AC Load 108.

Exemplary embodiments of the inverter 100 are described below, but these are only exemplary and are not exhaustive of the various implementations and variations that would be understood by those of skill in the art in view of the present disclosure. Given that three-phase power is most used, the following embodiments are described for three-phase power, but these embodiments can be expanded for a larger or smaller number of phases.

Figure 2:
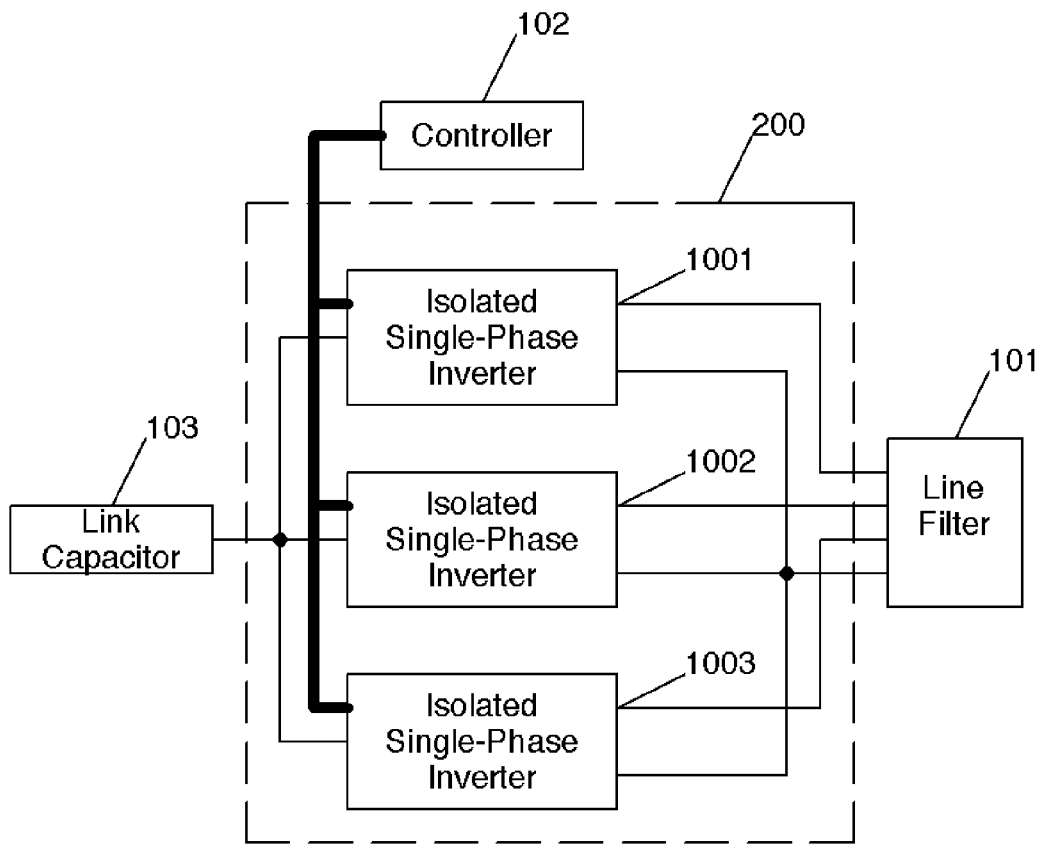
FIG. 2 illustrates an exemplary embodiment of an inverter that includes three isolated single-phase inverters connected in a Wye-configuration.

FIG. 2 illustrates an exemplary embodiment of the inverter 100 that utilizes three isolated single-phase inverters 1001, 1002, 1003 connected in a Wye-configuration to build a three-phase inverter 200 with individual phase control. As in FIG. 1, the DC side of the inverter 200 is coupled to the link capacitor 103, the AC side of the inverter 200 is coupled to the line filter 101 which is coupled to AC sources and loads, and the inverter 200 is coupled to the controller 102 for receiving control signals. For clarity, the DC/DC converters 104 and 105 are not shown in FIG. 2, but can still be connected in parallel with the link capacitor 103 on the DC side of the inverter 200. Each of the three isolated single-phase inverters 1001, 1002, and 1003 includes a DC connection, a neutral connection, a line connection and a control connection.

The DC connections of each of the isolated single-phase inverters 1001, 1002, and 1003 are coupled to the link capacitor 103. The neutral connections of each of the isolated single-phase inverters 1001, 1002, and 1003 are connected in parallel with the neutral connection of the line filter 101. Each of these isolated inverters can have galvanic (magnetic) isolation to isolate the common DC bus from the multiple phases of AC power. Given that the voltages of the AC phases are different at all times, and in many cases opposite polarities, the DC bus can become shorted through the inverters should the DC and AC sides not be isolated. The line connection of the single-phase inverter 1001 is coupled to phase A of the line filter 101, the line connection of the single-phase inverter 1002 is coupled to phase B of the line filter 101, and the line connection of the single-phase inverter 1003 is coupled to phase C of the line filter 101. Each of the single-phase inverters 1001, 1002, and 1003 individually synchronizes itself to its coupled AC voltage. The control connections of each of the isolated single-phase inverters 1001, 1002, and 1003 are connected to the controller 102 for receiving control commands.

When this system is operational, each of the inverters 1001, 1002, and 1003 can operate at different set points. These set points can include a desired charging or discharging current from the grid, as well as the phase angle of the current, relative to the voltage wave. Other set points can include, but are not limited to, a fixed reactive power control, fixed real power control, or regulating the voltage on the link capacitor. Each inverter individually synchronizes to the AC phase that is connected to it. Given that synchronization, the controller can offset the phase angle of the current using classical techniques known to one skilled in the art of grid-tied inverters. As compared with prior art, the individual single-phase inverters add more complexity to the system, but provide greater flexibility and less component stress than the traditional hex-bridge inverter.

Figure 3:
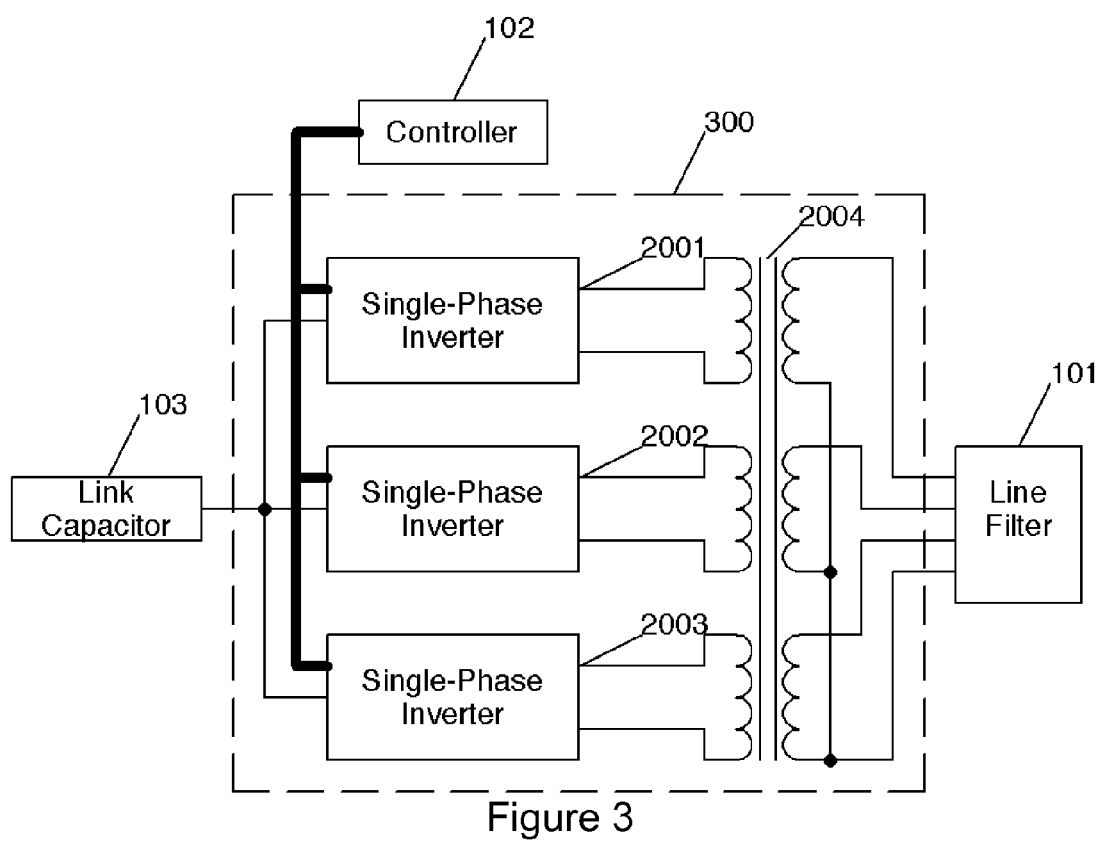
FIG. 3 illustrates an exemplary embodiment of an inverter that includes three non-isolated single-phase inverters and a transformer connected in a Wye-configuration.

FIG. 3 illustrates another exemplary embodiment of the inverter 100 that utilizes three single-phase inverters to build a three-phase inverter 300 with individual phase control. However, the inverter 300 uses three standard non-isolated single-phase inverters 2001, 2002, 2003 and an isolation transformer 2004 which couples the three non-isolated single-phase inverters 2001, 2002, 2003 to the grid. As in FIGS. 1 and 2, the AC side of the inverter 300 is in a Wye configuration coupled to line filter 101 which is coupled to AC sources and loads. As in FIGS. 1 and 2, the DC side of the inverter 300 is coupled to the link capacitor 103, and the inverter 300 is coupled to the controller 102 for receiving control signals. Again for clarity, the DC/DC converters are not shown, but can be connected in parallel with the link capacitor 103 on the DC side of the inverter 300. Isolation transformer 2004 provides galvanic (magnetic) isolation among all of the inverters and the AC grid connection. Each of the three non-isolated single-phase inverters 2001, 2002, and 2003 includes a DC connection, a neutral connection, a line connection and a control connection.

The DC connections of each of the non-isolated single-phase inverters 2001, 2002, and 2003 are coupled to the link capacitor 103. The AC connections of each connection are the Line (L) and Neutral (N). The control connections of each of the non-isolated single-phase inverters 2001, 2002, and 2003 are connected to the controller 102 for receiving control commands.

Single-phase inverters 2001, 2002, and 2003 operate by converting DC power from the DC link capacitor 103 into AC power, and vice versa given their inherent bidirectional nature. When the inverter 2001 produces AC power at its output, then that power is coupled through the isolation transformer 2004, onto AC power between phase A and the common AC neutral into the line filter 101. When the inverter 2002 produces AC power at its output, then that power is coupled through the isolation transformer 2004, onto AC power between phase B and the common AC neutral into the line filter 101. When the inverter 2003 produces AC power at its output, then that power is coupled through the isolation transformer 2004, onto AC power between phase C and the common AC neutral into the line filter 101. When drawing energy in from the AC grid, AC power is drawn from line filter 101 into the transformer 2004 into the desired phase and the common neutral. The power is then coupled through transformer 2004 onto the AC connection for the associated single-phase inverters. The inverters then operate to convert power from the AC connection to DC link capacitor 103.

Through the construction of this inverter, each phase can independently control the power that it is sourcing to or sinking from the AC grid. The wiring of the isolation transformer allows for each inverter's operation to be decoupled from the others. A traditional hex-bridge inverter operates under the requirement that at any given time the sum of the currents through the devices must sum to zero. It is possible to generate a synthetic neutral phase to allow for imbalance in the phases, but this causes a ripple current in the link capacitors, which may degrade their performance.

Figure 4:
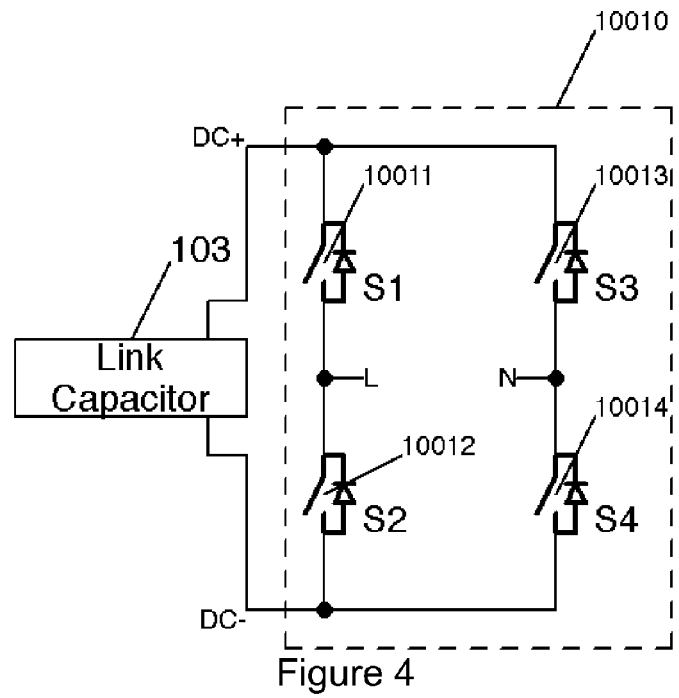
FIG. 4 illustrates an exemplary embodiment of a non-isolated single-phase inverter comprising four power-switching devices and four anti-parallel diodes in an H-Bridge configuration.

FIG. 4 shows an exemplary H-Bridge embodiment 10010 that can be used for the non-isolated single-phase inverters 2001, 2002, and 2003. The H-Bridge 10010 is comprised of four power-switching devices in parallel with diodes 10011, 10012, 10013, 10014 that are wired in an anti-parallel configuration. The DC connections of the H-Bridge converter are the DC+ and DC− nodes at the top and bottom of the bridge. The AC connections of the H-Bridge converter are at the common points between each series-connected pair of power switching device pairs. Between series-connected pairs 10011 and 10012, the common node is referred herein as Line (L), and the common connection between series-connected pairs 10013 and 10014 is referred herein as Neutral (N).

In an H-Bridge converter, diagonal devices are modulated together. In this case, the switches 10011 and 10014 would be modulated together, and the switches 10012 and 10013 would be modulated together. The nature of the H-Bridge is that when the switch 10011 is closed, then node L is tied to DC+, the positive DC Bus Voltage. When the switch 10014 is closed, then node N is tied to DC−, the negative DC Bus Voltage, which is typically ground (0V). This yields an output voltage from nodes L to N of the same magnitude as DC+ to DC−. By modulating one or both of the switches 10011 and/or 10014, the magnitude of the output voltage from L to N can be controlled. Proper control of this modulation, as is apparent to one skilled in the art, can form the positive half of a sinusoidal wave. Consequently, when modulating the opposite switch pair, when the switch 10013 is closed, node N is tied to DC+, and when the switch 10012 is closed, node L is tied to DC−. This yields a voltage from L to N of DC− to DC+, or negative DC+ if DC− is ground. Utilizing this polarity reversal as well as the modulation described above, the negative half of the sine wave can be constructed. By controlling the modulation of both sets of switches, a full sine wave can be generated from a DC source. While this is one exemplary manner of modulating the power switching devices known as Pulse-Width Modulation, there are others that include, but are not limited to, hysteretic modulation, space-vector modulation, and sine-triangle modulation.

Figure 5:
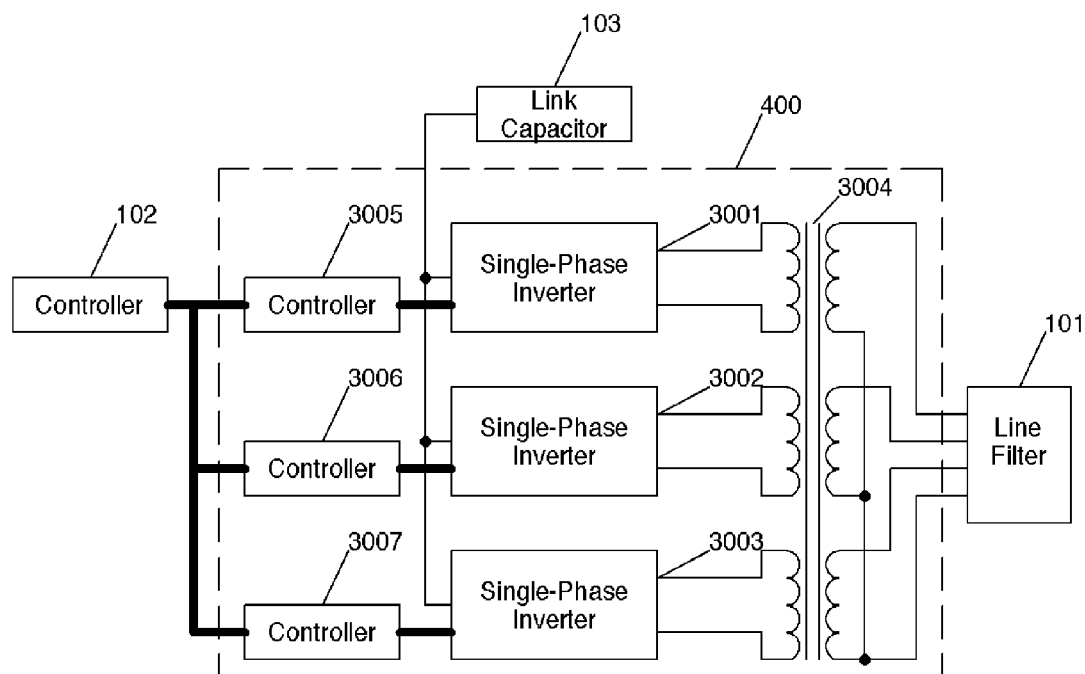
FIG. 5 illustrates an exemplary embodiment of an inverter that includes three non-isolated single-phase inverters and a transformer connected in a Wye-configuration with a local controller for each of the non-isolated single-phase inverters.

FIG. 5 illustrates another exemplary embodiment of the inverter 100 that utilizes three single-phase inverters to build a three-phase inverter 400 with individual phase control. The inverter 400 uses three non-isolated single-phase inverters 3001, 3002, and 3003 that are coupled to the grid through a transformer 3004. The AC side of the inverter 400 is in a Wye configuration coupled to line filter 101, which is coupled to AC sources and loads, and the DC side of the inverter 400 is coupled to the link capacitor 103. Unlike the previous embodiments, each single-phase inverter 3001, 3002, 3003 is coupled to a local controller 3005, 3006, 3007, respectively, and the local controllers 3005, 3006, 3007 are coupled to the global controller 102. The local controllers 3005, 3006, 3007 provide some level of local control to manage the functioning of the individual single-phase inverters 3001, 3002, and 3003. The local controllers 3005, 3006, and 3007 are each then controlled by the global controller 102. Separate controllers for each phase can provide easier scalability. All controllers have some limited hardware capability. Control of each phase requires some finite amount of hardware and processing resources. Once these resources are exhausted, the systems would need to be redesigned to support more phases. By utilizing a separate controller per phase, if more phases are required, an additional controller can be added with each single phase inverter, and the only overhead that is required of the global controller 102 is to pass along additional information to each local controller.

Figure 6:
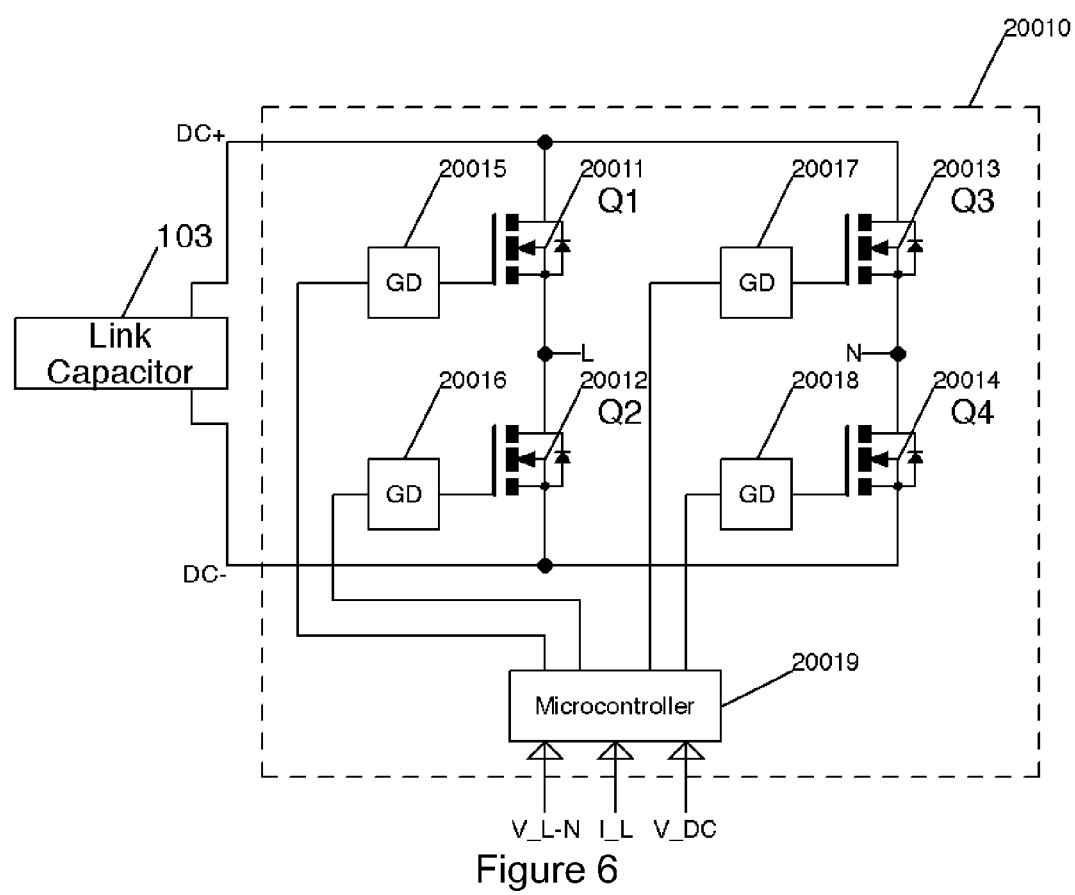
FIG. 6 illustrates an exemplary embodiment of a non-isolated single-phase inverter that includes four MOSFET transistors in an H-Bridge configuration, their associated gate drivers, and a micro controller.

FIG. 6 illustrates an exemplary embodiment of an H-Bridge topology 20010 utilizing MOSFET transistors 20011, 20012, 20013, 20014. In this embodiment, each MOSFET transistor 20011, 20012, 20013, 20014 includes an intrinsic diode within it, so no additional diodes need to be placed in parallel with the transistors. The MOSFET transistors 20011, 20012, 20013, 20014 are paired with gate drivers 20015, 20016, 20017, 20018, respectively. Similar to FIG. 4, the DC+ and DC− busses are connected to DC link capacitor 103 such that the H-Bridge 20010 and DC link capacitor 103 are in parallel. The gate drivers 20015, 20016, 20017, 20018 produce a voltage biased to drive the MOSFET transistors 20011, 20012, 20013, 20014 into the saturation region of their operation. Depending on the voltages used, the gate drivers 20015, 20016, 20017, 20018 may not be necessary, as the circuit may be driven sufficiently from standard voltages. A microcontroller 20019 operates similar to local controllers 3005, 3006 3007. The microcontroller 20019 can interpret input signals of the AC voltage (V_L-N), AC current (I_L), and DC Link Voltage (V_DC) to modulate the MOSFET transistors 20011, 20012, 20013, 20014 to produce an AC sine wave. The microcontroller 20019 can also drive the MOSFET transistors 20011, 20012, 20013, 20014 into saturation during time periods when the intrinsic diode is conducting to perform synchronous switching. Synchronous switching can reduce the losses of the converter during this time period.

Figure 7:
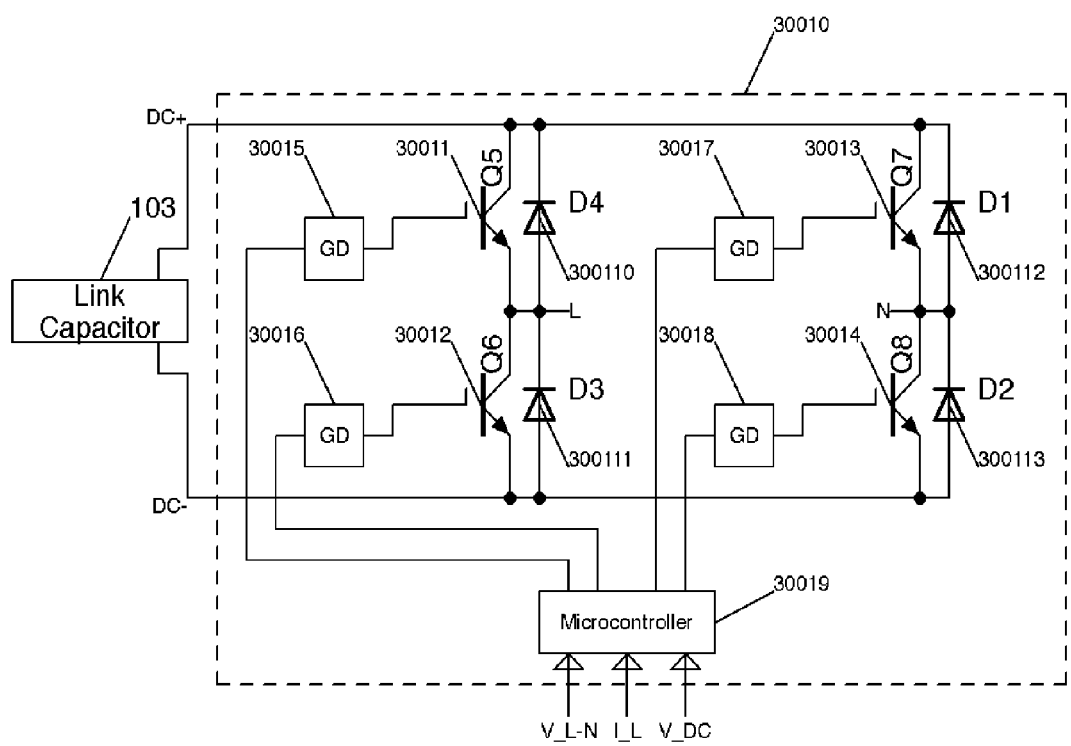
FIG. 7 illustrates an exemplary embodiment of a non-isolated single-phase inverter comprising IGBT transistor and anti-parallel diode pairs in an H-Bridge configuration, their associated gate drivers, and a micro controller.

FIG. 7 illustrates an exemplary embodiment of an H-Bridge topology 30010 utilizing IGBT transistors 30011, 30012, 30013, 30014. A diode is wired in parallel and paired with each of the IGBTs. The IGBTs 30011, 30012, 30013, 30014 are paired with diodes 300110, 300111, 300112, 30013, respectively. The IGBTs 30011, 30012, 30013, 30014 are also paired with gate drivers 30015, 30016, 30017, 30018, respectively. Similar to FIG. 4, the DC+ and DC− busses are connected to DC link capacitor 103, such that the H-Bridge 30010 and DC link capacitor 103 are in parallel. The gate drivers 30015, 30016, 30017, 30018 produce a voltage biased to drive the IGBT transistors 30011, 30012, 30013, 30014 into the saturation region of their operation. Depending on the voltages used, the gate driver circuit may not be necessary, as it can be driven sufficiently from standard voltages. A microcontroller 30019 can operate similar to local controllers 3005, 3006, 3007. The microcontroller 30019 can interpret input signals of the AC voltage (V_L-N), AC current (I_L), and DC Link Voltage (V_DC) to modulate the IGBTs 30011, 30012, 30013, 30014 to produce an AC sine wave.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

I claim:

1. A bi-directional poly-phase DC/AC inverter comprising:
   an AC side configured to receive input AC power from an AC source and configured to source output AC power to an AC load, each of the input and output AC power comprising a plurality of AC phases, each AC phase of the plurality of AC phases including a current waveform having a current amplitude and a current phase angle and a voltage waveform having a voltage amplitude and a voltage phase angle;
   a DC side configured to receive input DC power and configured to source output DC power;

wherein when the output AC power is greater than the input AC power, the input DC power from the DC side is supplied through the bi-directional poly-phase DC/AC inverter to provide additional AC power to the AC load; and when the input AC power is greater than the output AC power, excess power is provided through the bi-directional poly-phase DC/AC inverter to the DC side as the output DC power; and wherein for each AC phase of the plurality of AC phases, the current amplitude of the current waveform is controlled independently of the current amplitude of the current waveform in the other AC phases of the plurality of AC phases, and for each AC phase of the plurality of AC phases, the difference between the current and voltage phase angles is controlled independently of the difference between the current and voltage phase angles in the other AC phases of the plurality of AC phases.

2. The bi-directional poly-phase DC/AC inverter of claim 1, wherein the AC power comprises three AC phases.

3. The bi-directional poly-phase DC/AC inverter of claim 2, wherein the bi-directional poly-phase DC/AC inverter comprises three separate bi-directional single-phase DC/AC inverters, each of the three separate bi-directional single-phase DC/AC inverters controlling a different one of the three AC phases.

4. The bi-directional poly-phase DC/AC inverter of claim 3, wherein each of the three separate bi-directional single-phase DC/AC inverters is galvanically isolated from the DC side to the AC side.

5. The bi-directional poly-phase DC/AC inverter of claim 3, wherein each of the three separate bi-directional single-phase DC/AC inverters is a non-isolated single-phase inverter having a line connector and a neutral connector coupled to an isolation transformer having output windings; the output windings of the isolation transformer being wired in a Wye configuration.

6. The bi-directional poly-phase DC/AC inverter of claim 5, wherein each of the three separate bi-directional single-phase DC/AC inverters comprises an H-bridge comprised of a plurality of power switching devices.

7. The bi-directional poly-phase DC/AC inverter of claim 5, wherein each of the three separate bi-directional single-phase DC/AC inverters comprises an H-bridge comprised of four power switching devices.

8. The bi-directional poly-phase DC/AC inverter of claim 5, wherein each of the three separate bi-directional single-phase DC/AC inverters comprises an H-bridge comprised of four power switching devices in parallel with diodes wired in an anti-parallel configuration.

9. The bi-directional poly-phase DC/AC inverter of claim 5, wherein each of the non-isolated single-phase inverters further comprises a local controller.

10. The bi-directional poly-phase DC/AC inverter of claim 7, wherein the four power switching devices are four MOSFET transistors.

11. The bi-directional poly-phase DC/AC inverter of claim 8, wherein the four power switching devices are four IGBT transistors.

12. The bi-directional poly-phase DC/AC inverter of claim 9, wherein each of the three separate bi-directional single-phase DC/AC inverters comprises an H-bridge comprised of a plurality of power switching devices.

13. The bi-directional poly-phase DC/AC inverter of claim 9, wherein each of the three separate bi-directional single-phase DC/AC inverters comprises an H-bridge comprised of four power switching devices.

14. The bi-directional poly-phase DC/AC inverter of claim 11, wherein each of the three separate bi-directional single-phase DC/AC inverters comprises an H-bridge comprised of four power switching devices in parallel with diodes wired in an anti-parallel configuration.

15. The bi-directional poly-phase DC/AC inverter of claim 13, wherein the four power switching devices are four MOSFET transistors.

16. The bi-directional poly-phase DC/AC inverter of claim 14, wherein the four power switching devices are four IGBT transistors.

17. A converter system with individual real and reactive power control for each phase of a poly-phase system, the converter system coupling one or more DC loads/sources to one or more AC loads/sources using AC power having a plurality of AC phases, each AC phase of the plurality of AC phases including a current waveform having a current amplitude and a current phase angle and a voltage waveform having a voltage amplitude and a voltage phase angle, the converter system comprising:

a bidirectional poly-phase DC/AC inverter comprised of a plurality of bidirectional single-phase DC/AC inverters, each of the plurality of bidirectional single-phase DC/AC inverters having an AC side and a DC side, and each of the plurality of bidirectional single-phase DC/AC inverters handling a separate AC phase of the plurality of AC phases of the AC power; the AC side of each of the plurality of bidirectional single-phase DC/AC inverters configured to receive input AC power from and configured to source output AC power to the AC loads/sources, and the DC side of each of the plurality of bidirectional single-phase DC/AC inverters configured to receive input DC power from and configured to source output DC power to the DC loads/sources;

an AC line filter having an AC inverter side and an AC source/load side, the AC inverter side being coupled to the AC sides of the plurality of bidirectional single-phase DC/AC inverters and the AC source/load side being coupled to the AC loads/sources;

a link capacitor connected in parallel with the DC sides of the plurality of bidirectional single-phase DC/AC inverters;

at least one bidirectional DC to DC converter connected in parallel with the link capacitor, the at least one bidirectional DC to DC converter being coupled to the DC loads/sources;

a controller that controls the plurality of bidirectional single-phase DC/AC inverters and the at least one bidirectional DC to DC converter; the controller controls the current amplitude of the current waveform of each AC phase of the plurality of AC phases independently of the current amplitude of the current waveform of the other AC phases of the plurality of AC phases, and the controller controls the difference between the current and voltage phase angles of each AC phase of the plurality of AC phases independently of the difference between the current and voltage phase angles of the other AC phases of the plurality of AC phases.

18. The converter system of claim 17, wherein the plurality of bidirectional single-phase DC/AC inverters consists of three separate bidirectional single-phase DC/AC inverters; and all of the AC loads/sources use three phase AC power.

19. The converter system of claim 18, wherein each of the three separate bidirectional single-phase DC/AC inverters is galvanically isolated from the DC side to the AC side.

20. The converter system of claim 18, wherein each of the three separate bidirectional single-phase DC/AC inverters is a non-isolated single-phase inverter having a line connector and a neutral connector coupled to an isolation transformer having output windings; the output windings of the isolation transformer being wired in a Wye configuration.

* * * * *